United States Patent [19]

Otani

[11] Patent Number: 5,283,666
[45] Date of Patent: Feb. 1, 1994

[54] AREA DESIGNATING APPARATUS
[75] Inventor: Kazuo Otani, Kodaira, Japan
[73] Assignee: Canon Kabushiki Kaisha, Tokyo, Japan
[21] Appl. No.: 756,983
[22] Filed: Sep. 9, 1991
[30] Foreign Application Priority Data
Sep. 12, 1990 [JP] Japan .................................. 2-243452
[51] Int. Cl.⁵ .............................................. H04N 1/387
[52] U.S. Cl. ..................................... 358/453; 358/452; 358/449
[58] Field of Search ............... 358/448, 449, 451, 452, 358/453; 340/712, 709, 721
[56] References Cited
U.S. PATENT DOCUMENTS
4,684,999 8/1987 Sakakibara et al. ................. 358/452

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An area designating apparatus which determines the length of a desired area of an image in one of two directions by designating two points. The apparatus having a designating unit for designating a desired position, a detecting unit for detecting the position designated by the designating unit, and a controlling unit for storing in a memory the last position detected by the detecting unit and the position detected by the detecting unit immediately before detecting the last detected position, as the coordinate values of the desired area in one of the two directions.

24 Claims, 17 Drawing Sheets

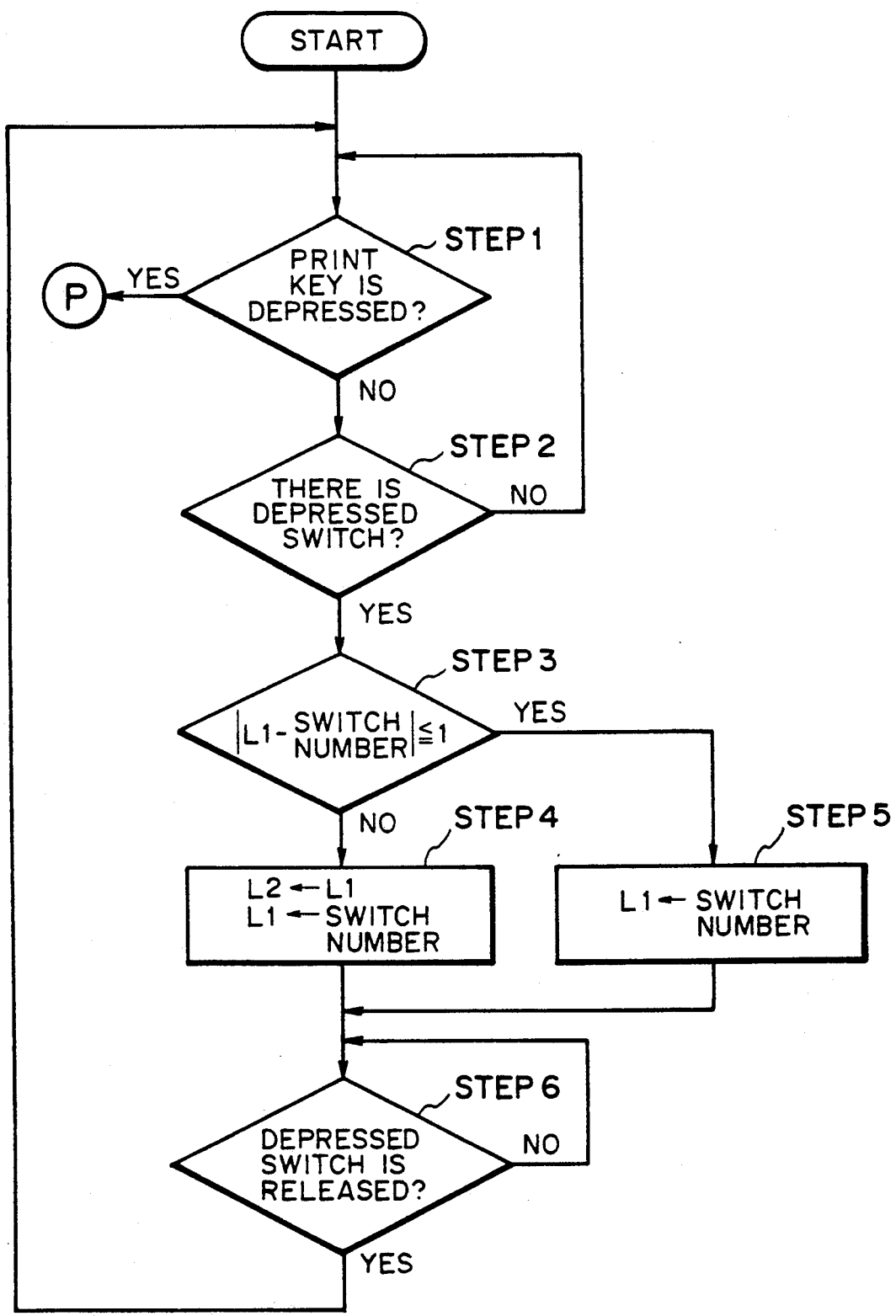
F I G. 10

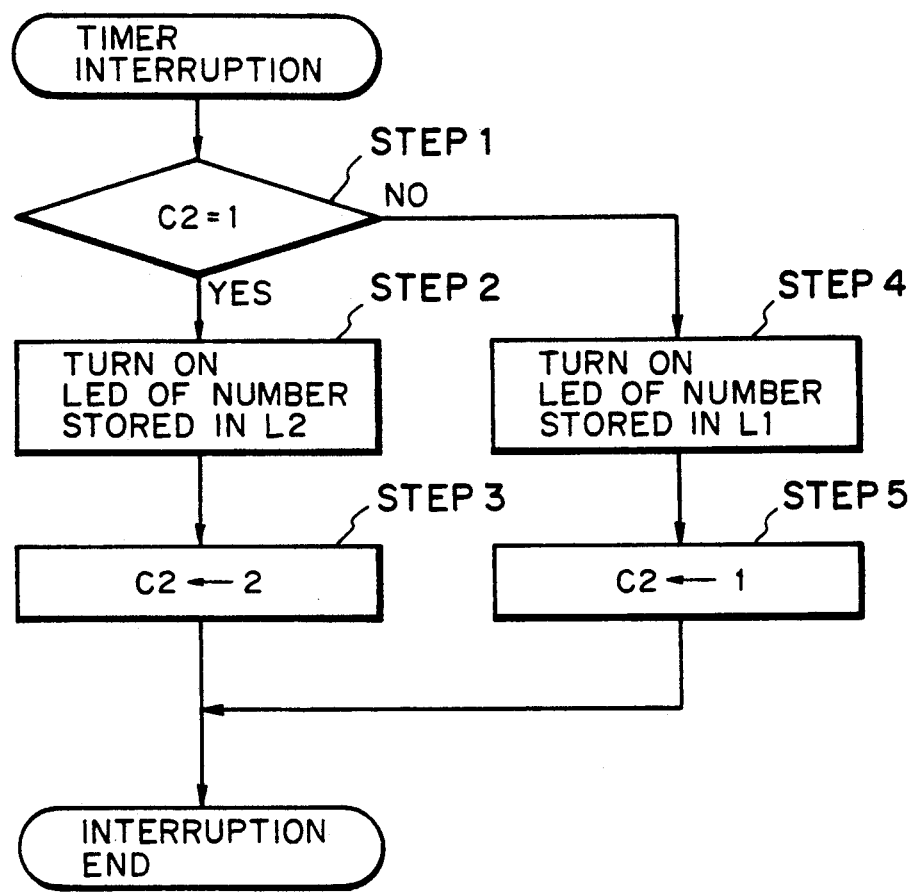
F I G. 14
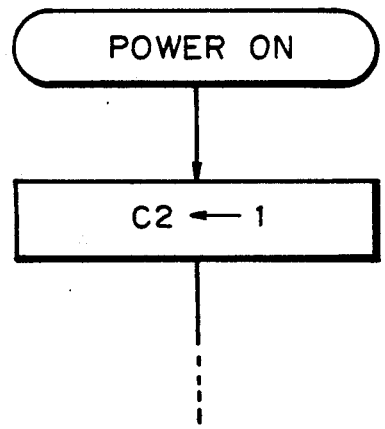
F I G. 15

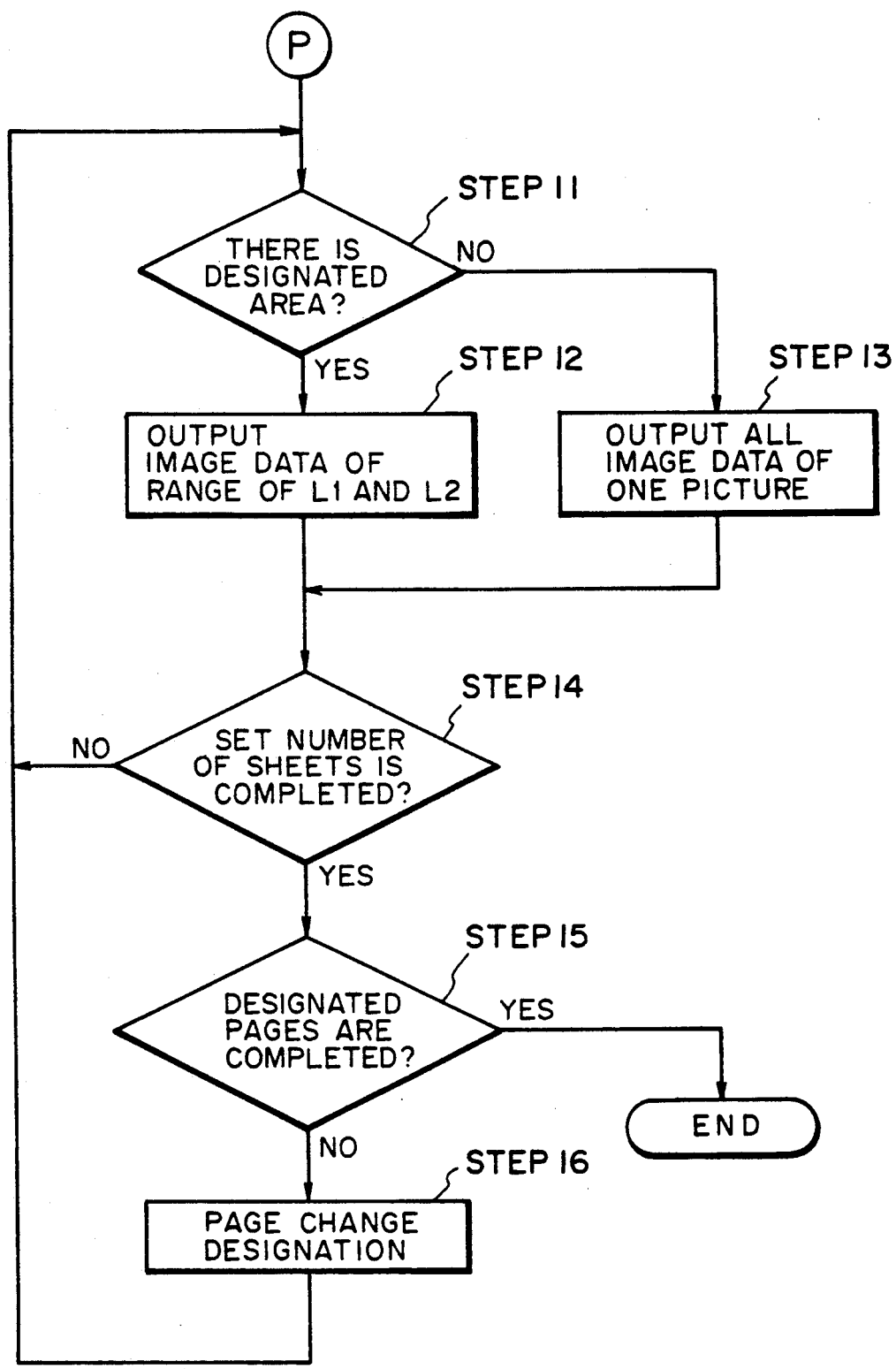
F I G. 16

AREA DESIGNATING APPARATUS

BACKGROUND OF THE INVENTION

1. Field of the Invention

The present invention relates to an area designating apparatus for designating a desired area of an image.

2. Related Background Art

Various types of microfilm readers/printers are known, which project an enlarged image in a microfilm onto a screen or record an image in a microfilm on a sheet. U.S. Pat. No. 4,700,237 or other documents describe a microfilm reader/printer of the type that a desired area of an image projected to a screen is designated to record only the image in the designated area on a sheet.

The microfilm reader/recorder described in U.S. Pat. No. 4,700,237 designates a desired area by using cursors mounted on the left and lower sides of a screen. A smooth area designation becomes impossible in some cases because it takes too much time to move the two cursors.

U.S. Pat. No. 4,965,678 describes that using a digitizer and a point pen, a desired area (of a rectangle) is designated by pointing diagonal two corners or four corners. According to U.S. Pat. No. 4,965,678, even if a partial area of an already designated area is to be changed, it is necessary to again point diagonal two corners or four corners, resulting in a poor handling operation.

SUMMARY OF THE INVENTION

It is an object of the present invention to provide an area designating apparatus eliminating the above-described disadvantages.

It is another object of the present invention to provide an area designating apparatus capable of improving the handling operation of designating a desired area, by making valid the last two designated points.

It is a further object of the present invention to provide an area designating apparatus capable of improving the handling operation of designating a desired area, by determining whether or not an already designated point is made valid or invalid, in accordance with the positions of a newly designated point and the already designated point.

The above and other objects of the present invention will become more apparent from the following description and claims when read in connection with the accompanying drawings.

BRIEF DESCRIPTION OF THE DRAWINGS

FIGS. 9 to 13 are flow charts of area designating methods according to the embodiments of the present invention;

FIGS. 14 and 15 are flow charts of a method of displaying a designated area;

FIG. 16 is a flow chart of a print routine; and

DETAILED DESCRIPTION OF THE PREFERRED EMBODIMENTS

The embodiments of the present invention will be described with reference to the accompanying drawings.

Figure 1:
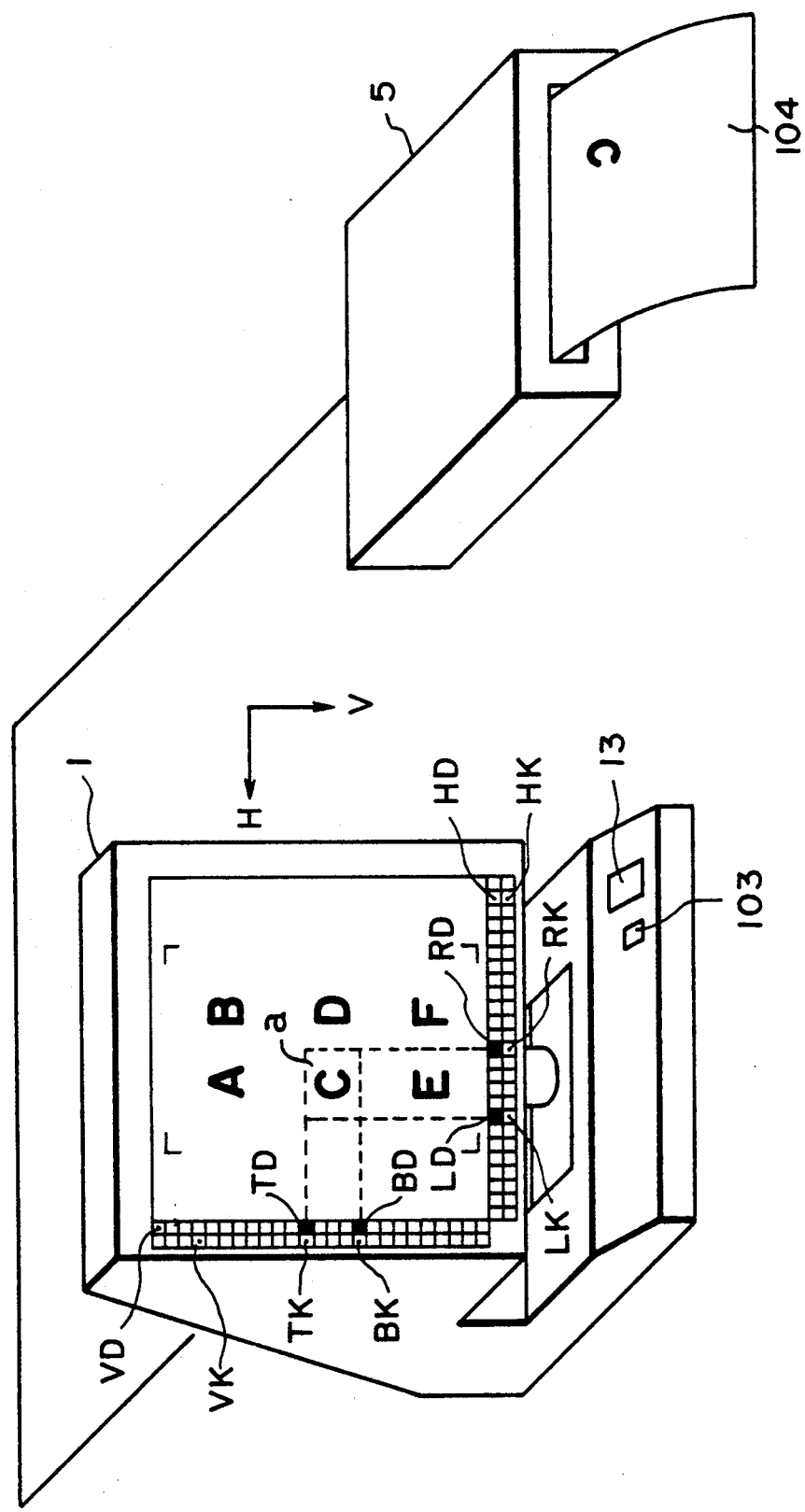
FIG. 1 shows a microfilm reader/printer having an area designating function.
Figure 2:
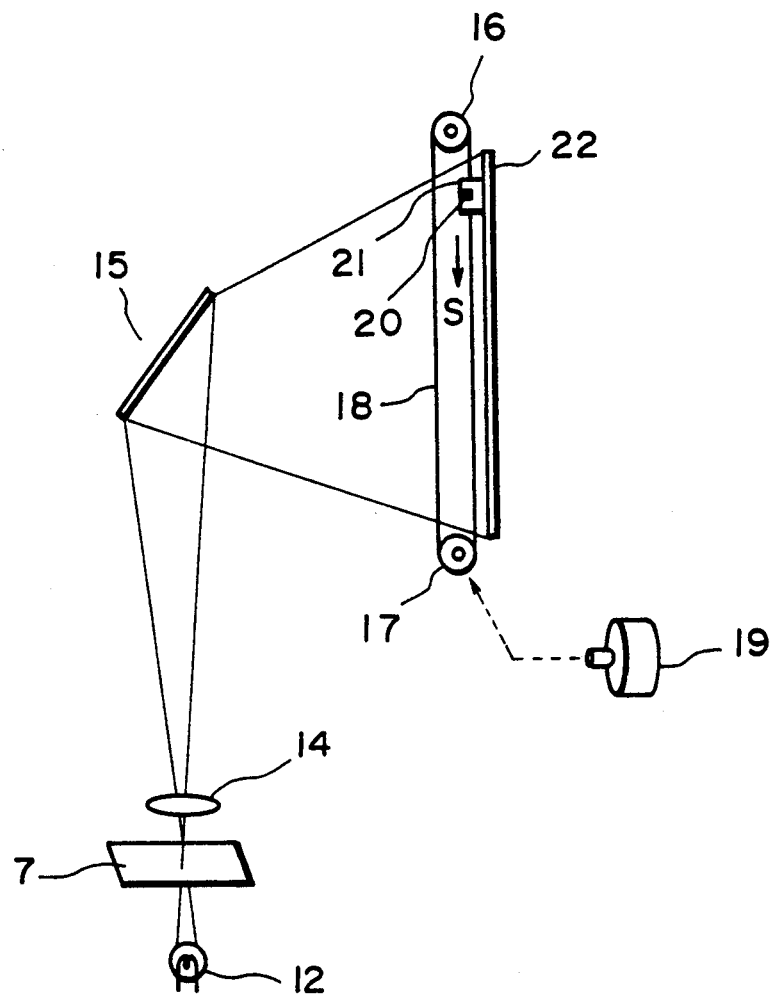
FIG. 2 is a diagram illustrating a scan operation by a sensor unit of the microfilm reader/printer.

FIG. 1 is a diagram showing a microfilm reader/printer to which the present invention is applicable.

In FIG. 1, reference numeral 1 represents a scanner unit having a function of projecting an enlarged image in a microfilm on a screen, and a function of photoelectrically converting an image in a microfilm into an electrical image signal. Reference numeral 5 represents a printer for printing an image signal.

The structure and operation of a scanner unit will be described with reference to FIGS. 1, 2, 3, 7 and 8.

An image in a microfilm 7 is illuminated by a light source 12 such as a halogen lamp and projected on a screen 22 via a lens 14 and a mirror 15. A user can thus view the image externally of the microfilm reader/printer.

When a microcomputer 25 detects a depression of a print key 13, the microcomputer 25 causes a scan motor 19 to drive. As the motor 19 is driven, a sensor unit 21 moves in the direction indicated by an arrow S (FIG. 2) by means of a wire 18 and pulleys 16 and 17. The sensor unit 21 is disposed at the back of the screen, facing the mirror 15, and has a sensor 20 such as a CCD.

As shown in the block diagram of FIG. 3, an image signal from the sensor unit 21 synchronizing with a horizontal synchro signal h to be described later is quantized by an A/D conversion unit AD and an image processing unit SL executing a binarization process and the like, and thereafter sent to a printer unit 5 via a gate G to be described later. The structure and operation of the printer unit 5 will be described with reference to FIGS. 7 and 8.

The printer unit 5 may use a known laser beam printer using electrophotography technique, a bubble jet printer which ejects ink using a thermally generated bubble, or other types of printers. In this embodiment, a laser beam printer is used by way of example. A photosensitive drum 40 is rotated in the direction i by a motor (not shown). The surface of the photosensitive drum 40 is uniformly charged by a charger 41. An image signal from the scanner unit 1 obtained via a scanner interface (not shown) built in the printer is supplied to a laser oscillator 42. The laser beam modulated by the image signal is scanned in the horizontal direction by a polygon mirror 43 which is rotated in the direction 1 by a polygon motor 44. As the laser beam k scanned by the polygon mirror 43 is applied to the surface of the photosensitive drum, an electrostatic latent image is produced on the surface of the photosensitive drum. The electrostatic latent image is developed as a toner image by a developer 45. The toner image is transferred to a transfer sheet 6 by a transfer charger 46 and fixed thereon by a fixer 47.

When the laser beam k is applied to a beam detector 41 mounted near one side of the photosensitive drum 40, the beam detector 41 causes the horizontal synchro signal h to be generated. This horizontal synchro signal h is applied to the scanner unit 1 and used when reading an image by the sensor 20 shown in FIG. 3.

Next, a trimming operation will be described for printing a particular area of an image projected on the screen 22.

Figure 4:
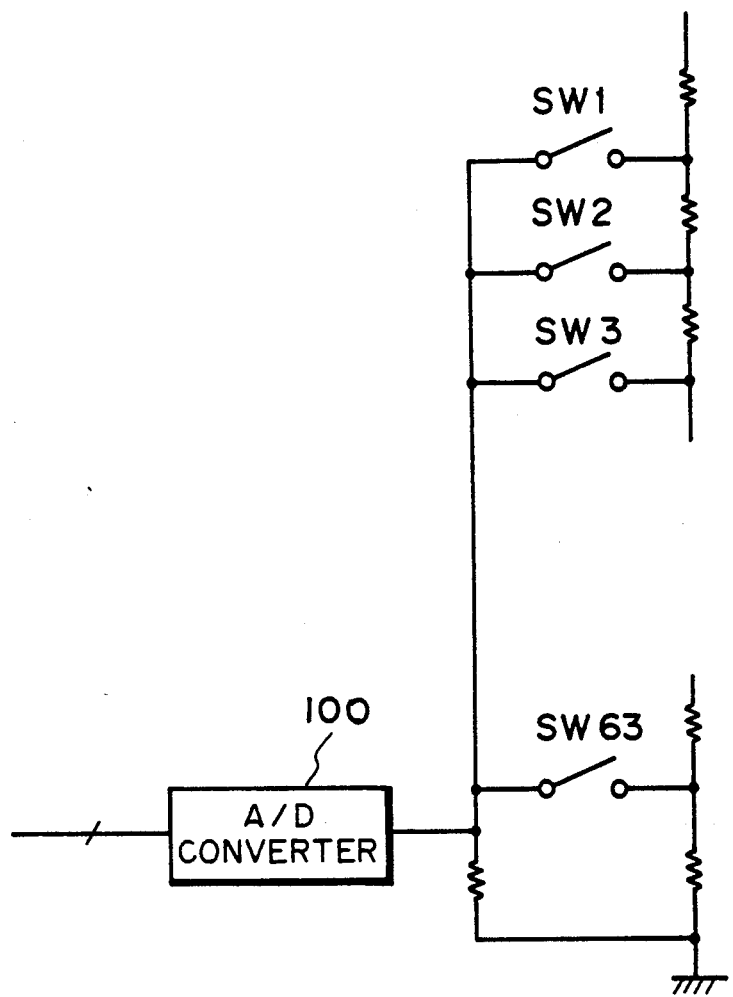
FIG. 4 is a circuit diagram of an area designating unit.

Coordinate designating switches are shown in FIG. 4. In this embodiment, sixty three switches and divider resistors are connected as shown in FIG. 4, in the main and sub scan directions of the sensor 20. A voltage corresponding to the depressed switch is applied to and quantized by an A/D converter 100 and inputted to the microcomputer 25. The microcomputer 25 selectively turns on an LED of a coordinate display shown in FIG. 5, in accordance with the depressed switch, i.e., an input from the A/D converter 100.

Figure 5:
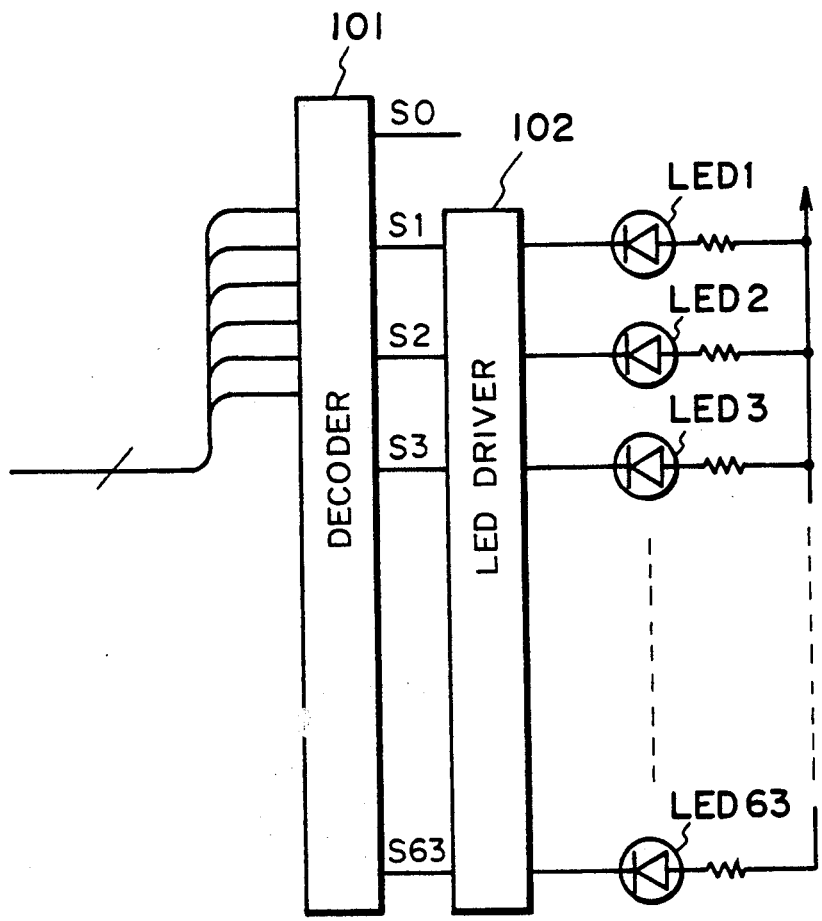
FIG. 5 is a circuit diagram of an area display unit.
Figure 6:
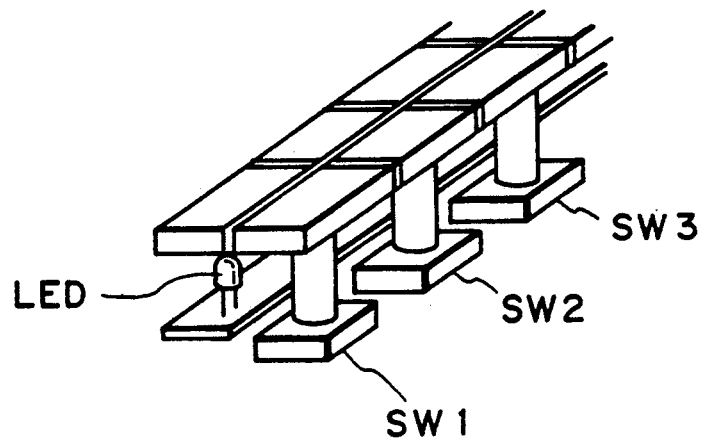
FIG. 6 shows the structure of the area designating unit and area display unit.
Figure 7:
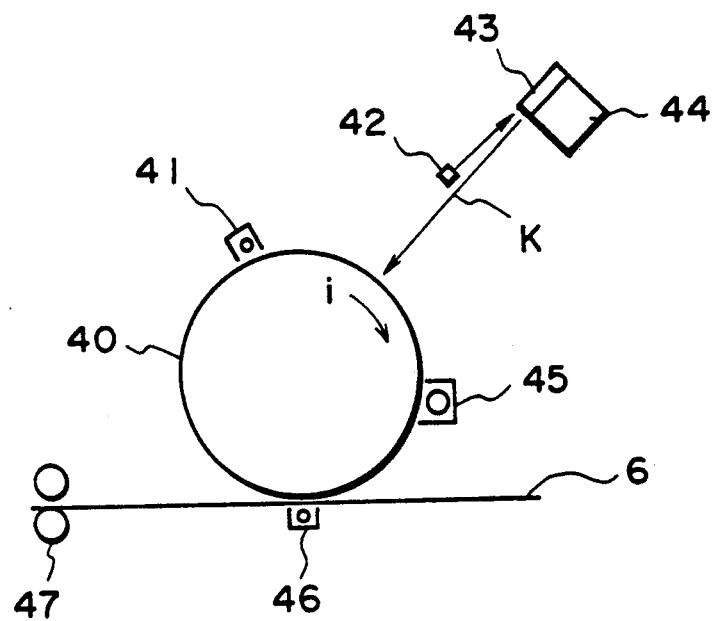
FIGS. 7 and 8 show the internal structure of a laser beam printer.
Figure 8:
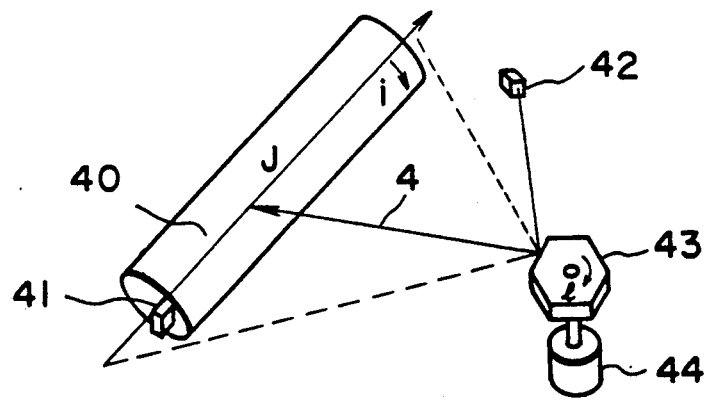

As shown in FIG. 5, an LED selection signal from the microcomputer 25 is a 6 bit data in this embodiment which is inputted to a decoder 101. LED illumination signals S0 to S63 decoded by the decoder 101 are supplied to an LED driver 102 to selectively illuminate LED 1 to LED 63. LED illumination signal S0 is used for turning off all LED 1 to LED 63. Two sets of coordinate switches and displays such as shown in FIG. 6 for the horizontal and vertical directions are mounted near the screen as shown in FIG. 1. In this embodiment, the area a shown in FIG. 1 is trimmed by way of example.

A user pushes four switches LK, RK, TK, and BK. The switch LK corresponds to the left side of the area a, the switch RK to the right side, the switch TK to the upper side, and the switch BK to the lower side. Then, the voltages corresponding to the switches are supplied to the microcomputer 25 via the A/D converter 100 shown in FIG. 4. Each time a switch is pushed, the microcomputer 25 supplies the LED selection signal corresponding to the depressed switch to the decoder 101 shown in FIG. 5. Accordingly, a display RD of FIG. 1 for the left side is illuminated, and the other displays RD, TD, and BD are also illuminated for the right, upper, and lower sides, respectively. The above-described control is executed by a program stored in a ROM (not shown) connected to the microcomputer shown in FIG. 3. The program is shown by the flow charts of FIGS. 13 and 14.

Figure 13:
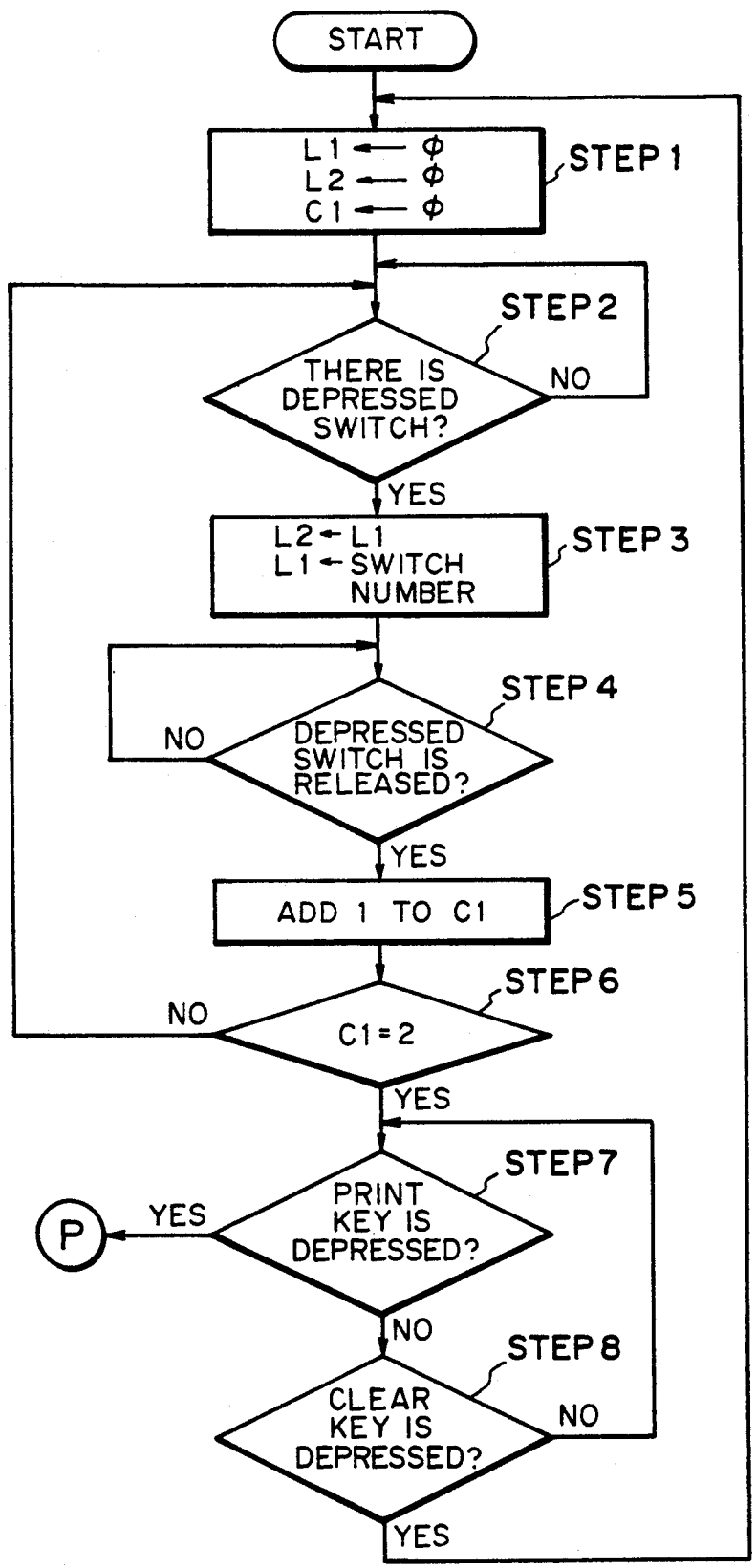

The flow charts of FIGS. 13 and 14 illustrate a method of designating a position in the horizontal or vertical direction. Designating a position in the horizontal direction will be described by way of example. L1 and L2 represent a register for storing a coordinate value, i.e., a switch number for the right or left side. The registers are realized by a memory (not shown) connected to the microcomputer 25. At step 1, "0" is set to the registers L1 and L2 for initialization. C1 represents a counter register realized by the memory. The counter register C1 is cleared to "0" for initialization. At step 2, a depression of any horizontal coordinate designating switch is waited. Upon depression of the horizontal coordinate designating switch, at step 3 the coordinate value L1 is stored in L2, and the number of the depressed switch is stored in L1. At step 4, it is waited until the switch is released. At step 5, the counter register C1 is incremented by "1". It is judged from the value of the counter register C1 if the coordinate values of two points have been set or not. If the coordinate value of only one point has been set, the flow returns to step 2 to wait the second coordinate value setting. If the coordinate values of two points have been already set (C=2), it is judged that the coordinate values for the right and left sides have been set to thereby advance to step 7 whereat it is judged if the print key 13 has been depressed or not. If depressed, the control advances to the print routine P shown in FIG. 15. If not depressed, the flow advances to step 8 to check whether or not the clear key 103 has been depressed in order to change the area setting If the clear key has been depressed, the flow returns to step 1.

FIG. 14 is a flow chart showing a process which is executed by an interruption routine having a predetermined repetition period. While the program of FIG. 13 runs, only one of the LEDs shown in FIG. 5 turns on at a time. Therefore, a known dynamic illumination for periodically and alternately turning on two LEDs is carried out by using the interruption routine. Upon occurrence of an interruption having the predetermined repetition period, it is judged at step 1 if a counter register C2 is "1" or not. The counter register C2 is used for determining if the LED having been turned on until then is the LED whose number is stored in L1 or L2. If "1" is stored in the counter register C2, at step 2 the LED whose number is stored in L2 is turned on. At step 3, C2 is set to "2". If "1" is not stored, at step 4 the LED whose number is stored in L1 is turned on. At step 5, C2 is set to "1". As shown in FIG. 15, the counter register C2 is initialized to "1" upon power-on of the scanner unit 1. If "0" is stored in L1 or L2, the LED illumination signal S0 is selected so that no LED is turned on.

Figure 3:
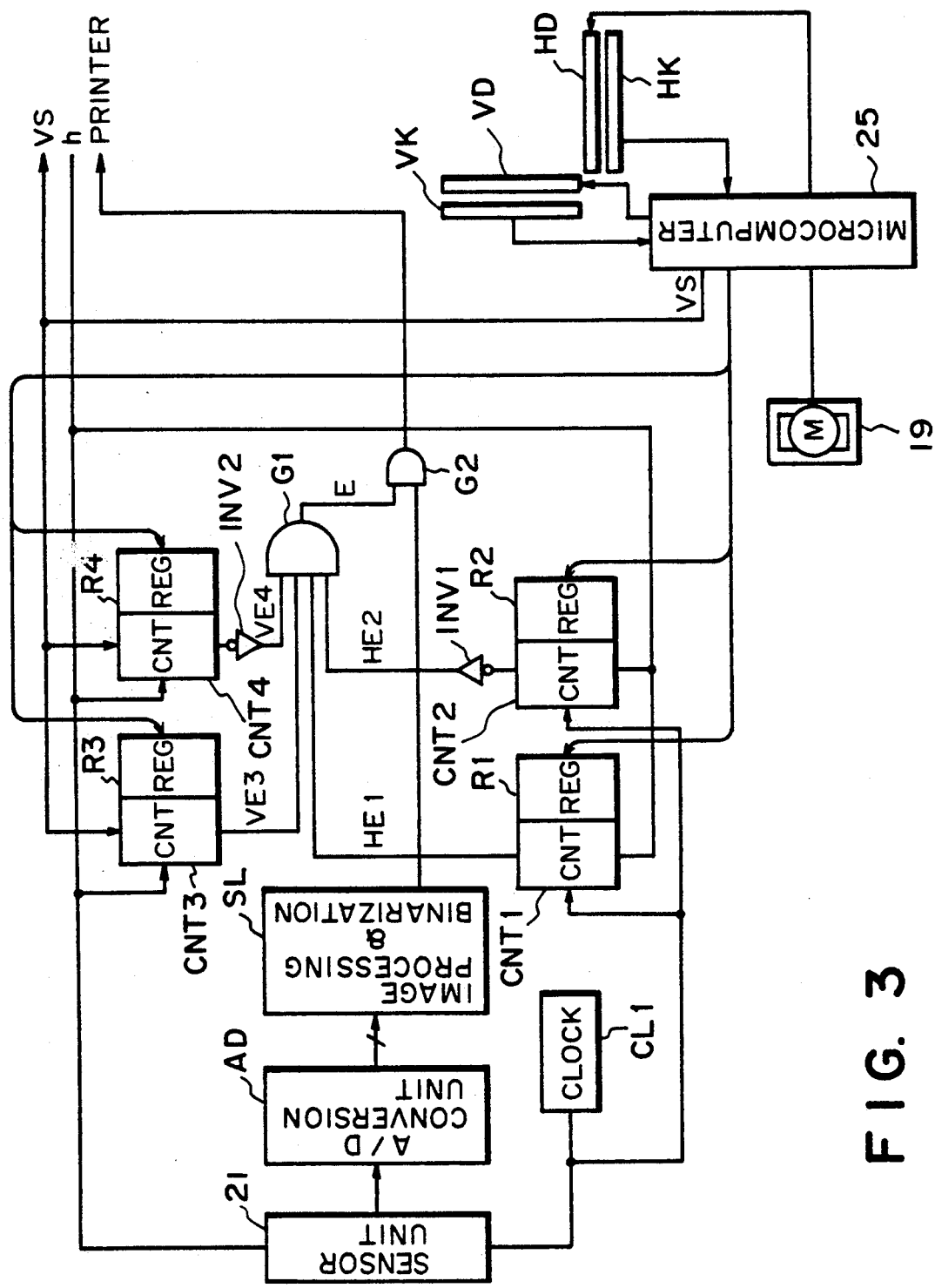
FIG. 3 is a circuit diagram of the scanner unit of the microfilm reader/printer having an area designating function.

In the print routine P, if an area has been designated, the coordinate value of the right side converted into a value in a pixel unit is stored in a register R1 shown in FIG. 3 before sensor unit 21 scans. Similarly, the value corresponding to the left side is stored in a register R2, the value corresponding to the upper side in a register R3, and the value corresponding to the lower side in a register R4. Counters CNT 1 to CNT 4 are supplied with a reset signal, and thereafter count the clocks from a clock generator CL 1. Each counter CNT 1 to CNT 4 outputs a coincidence signal when the count becomes coincident with the value of each register R1 to R4. The sensor unit 21 scans an image by one line in the direction H shown in FIG. 1 (called a main scan), and moves in the direction V (called a sub scan). Counters CNT 1 and CNT 2 are supplied, as a clock input, with clocks CL 1 having a period corresponding to one pixel, the clocks CL 1 being used for driving the sensor unit 21, and as a reset input, with the horizontal synchro signal h. Counters CNT 3 and CNT 4 are supplied, as a clock input, with the horizontal synchro signal h, and as a reset input, the vertical synchro signal vs which is supplied from the microcomputer 25 to start driving the motor 19. As a result, during the period from when the horizontal synchro signal h is generated to when the right side of the designated area is main-scanned, HE 1 maintains OFF and thereafter it becomes ON. During the period from when the horizontal synchro signal h is generated to when the left side of the designated area is main-scanned, HE 2 maintains ON and thereafter it becomes OFF. Similarly, during the period from when the vertical synchro signal vs is generated to when the upper side of the designated area is sub-scanned, VE 1 maintains OFF and thereafter it becomes ON. During the period from when the vertical synchro signal vs is generated to when the lower side of the designated area is sub-scanned, VE 2 maintains ON and thereafter it becomes OFF (step 12). In this manner, E maintains ON only during the period while the designated area a is scanned. Thus, as indicated at 104 in FIG. 1, an image trimming only the area a can be printed. The above process is repeated as many times as the number of sheets or pages designated. If there is no area designation, data for a whole page is sent to the printer.

In the above-described flow charts, if an area once designated is to be changed, e.g., if the right side only is to be changed, it becomes necessary to depress the clear key and again set the right, left, upper, and lower sides, or to select a coordinate point to be changed.

Figure 9:
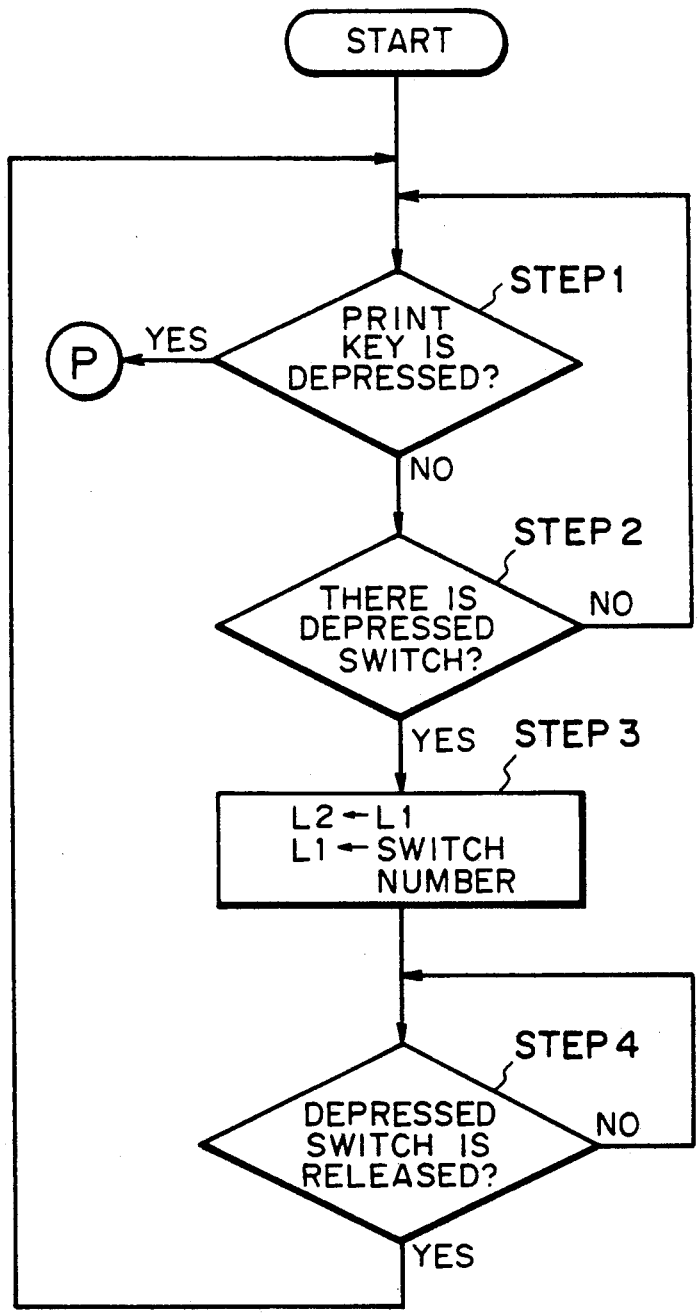

FIG. 9 is a flow chart of an improved version of the program shown in FIGS. 13 and 14. FIG. 9 is a flow chart illustrating a method of designating a coordinate value in the horizontal direction or vertical direction. Displaying the designated coordinate point is carried out using the program explained with FIGS. 14 and 15. Referring to FIG. 9, it is judged at step 1 if the print key has been depressed. If depressed, the above-described print process is executed. In this case, if the area designation was released using a reset key of an operation unit (not shown), an image of the whole page is printed. If the area designation is not released, trimming print is carried out in accordance with the values stored in L1 and L2. If the print key has not been depressed, it is judged at step 2 if any one of the coordinate designating switches has been depressed. If not, the flow returns to step 1. If depressed, the switch number already stored in L1 is stored in L2, and the number of the newly depressed switch is stored in L1. At step 3 it is waited until the depressed switch is released. Thereafter, the flow returns to step 1.

Figure 17A:
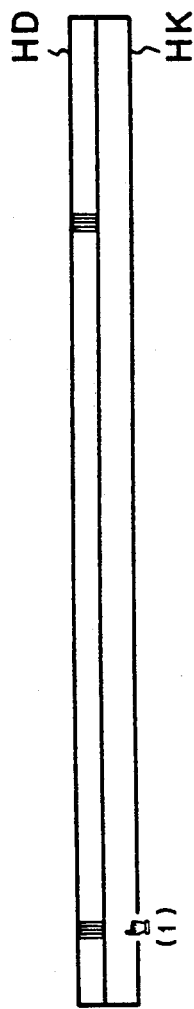
FIGS. 17A to 20D show display examples when an area is designated.
Figure 17B:
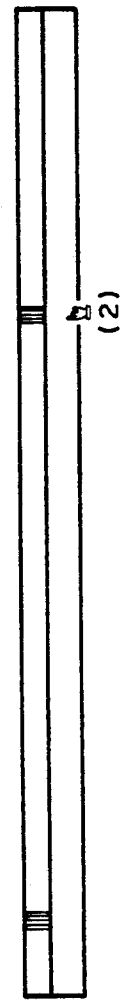
Figure 17C:
Figure 17D:
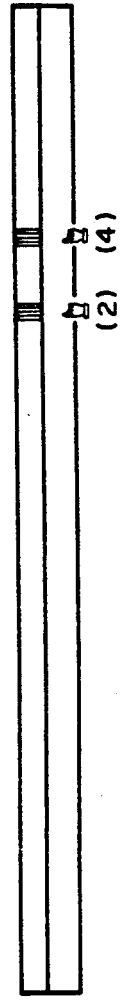

FIGS. 17A to 17D show examples of displayed coordinate designations. FIG. 17A shows a display when a switch at ① is depressed. As shown in FIG. 17B, if a switch at ② is depressed thereafter, the coordinate point at ① depressed immediately before the switch at ② and the coordinate point at ② newly depressed are displayed. As shown in FIG. 17C, if a switch at ③ is depressed thereafter, the coordinate point at ① is canceled and the coordinate point at ② depressed immediately before the switch at ③ and the coordinate point at ③ newly depressed are displayed. After the condition shown in FIG. 17B, if a switch at ④ is depressed, as shown in FIG. 17D, the coordinate points at ② and ④ are displayed. In this manner, the coordinate points for the last two switches depressed are displayed.

Using the program described above, an already designated area can be changed, for example, by depressing the horizontal coordinate designating switches at the right and left sides (or right or left side), without clearing all settings using the clear key.

The program shown in the flow chart of FIG. is made to run in parallel for both the horizontal and vertical directions by using a known multi-task processing or the like. In such a case, it is not necessary to depress a clear key and again set all the coordinate points at the upper, lower, right, and left sides, or to select a coordinate point to be changed and enter the coordinate value. Instead, the two or one of the coordinate points at the right and left sides is directly set again.

In the above-described second embodiment, if only the coordinate point is to be changed and if the previous settings were carried out first for the left side and then for the right side, the coordinate point at the left side is canceled upon entering the new coordinate point as shown in FIGS. 17B and 17D. If the newly designated coordinate point is near the coordinate point already designated, then it is controlled such that the coordinate point newly designated is entered. For example, if the coordinate point is changed to a point near at the right side, it is not necessary to again designate the coordinate point the left side.

FIG. 10 is a flow chart of the program according to the third embodiment. FIG. 10 is a flow chart illustrating a method of designating a coordinate value in the horizontal direction or vertical direction. Displaying the designated coordinate point is carried out using the program of the first embodiment shown in FIGS. 14 and 15. Referring to FIG. 10, it is judged at step 1 if the print key has been depressed. If depressed, the above-described print process is executed. If not depressed, it is judged at step 2 if any one of the coordinate designating switches has been depressed. If not depressed, the flow returns to step 1. If depressed, it is judged at step 3 if a difference between the switch number stored in L1 and the presently depressed switch number is equal to or smaller than a predetermined value. In this embodiment, this value is set to "1". However, any other proper value may be used. At the next step in the second embodiment, the switch number in L1 is stored in L2, and the newly depressed switch number is stored in L1. However, in this embodiment, if the newly depressed switch has the switch number near that stored in L1, the switch number stored in L1 only is changed by neglecting the order of depressing switches (step 5). If the newly depressed switch has the switch number near that stored in L2 or has the switch number not near both the numbers stored in L1 and L2, the numbers in L1 and L2 are changed in the order of depressing switches (step 4). At step 6 it is waited until the depressed switch is released. Thereafter, the flow returns to step 1.

Figure 18A:
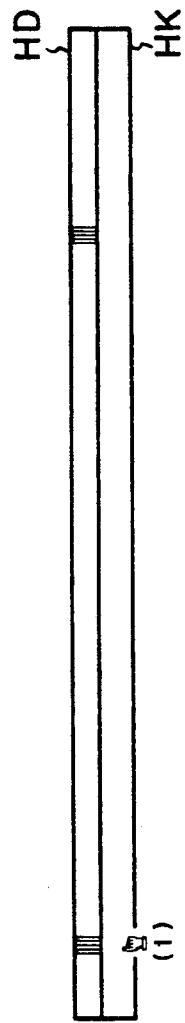
Figure 18B:
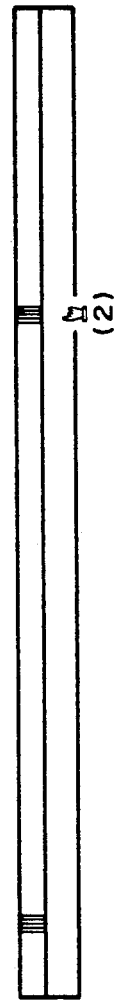
Figure 18C:
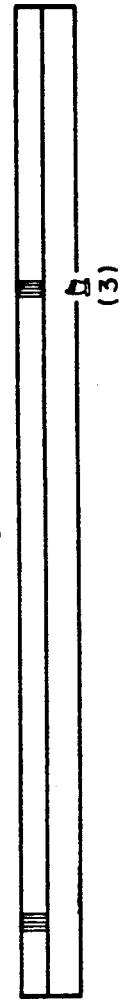

FIGS. 18A to 18C show examples of displayed coordinate designations. As shown in FIGS. 18A and 18B, switches at and ① and ② are sequentially depressed in this order. As shown in FIG. 18C, if a switch ③ at is depressed thereafter, the coordinate point at ② is canceled and the coordinate points at ① and ③ are displayed.

Using the program described above, if an already designated area is to be changed, for example, if the coordinate point at the right side is to be slightly changed in the horizontal direction, the newly designate coordinate point near the right side is displayed irrespective of the order of designating switches. If the coordinate point near that designated in the above manner is to be changed again, the newly designated coordinate point can be displayed without influencing the other coordinate point. The program shown in the flow chart of FIG. 10 is made to run in parallel for both the horizontal and vertical directions by using a known multi-task processing or the like. In such a case, it is possible to slightly shift one of the coordinate points at the right, left, upper, and lower sides.

The coordinate designating switches are disposed near each other as shown in FIG. 6. Consider the case where after SW 2 shown in FIG. 6 is depressed and corresponding LED 2 is turned on, the coordinate point at switch SW 3 and LED 3 is considered to be more desirable. In such a case, it is preferable and natural for an operator to slide the finger from the switch SW 2 and SW 3 instead of once detaching the finger from SW 2 and then depressing SW 3. In the second and third embodiments, the next switch is not entered until the previous switch is released from depression.

The present embodiment considers such a case, e.g., the case wherein a finger is slid to SW 3 while depressing SW 2 so that SW 3 is depressed after the period when both SW 2 and SW 3 are depressed at the same time for a predetermined time period.

Figure 11:
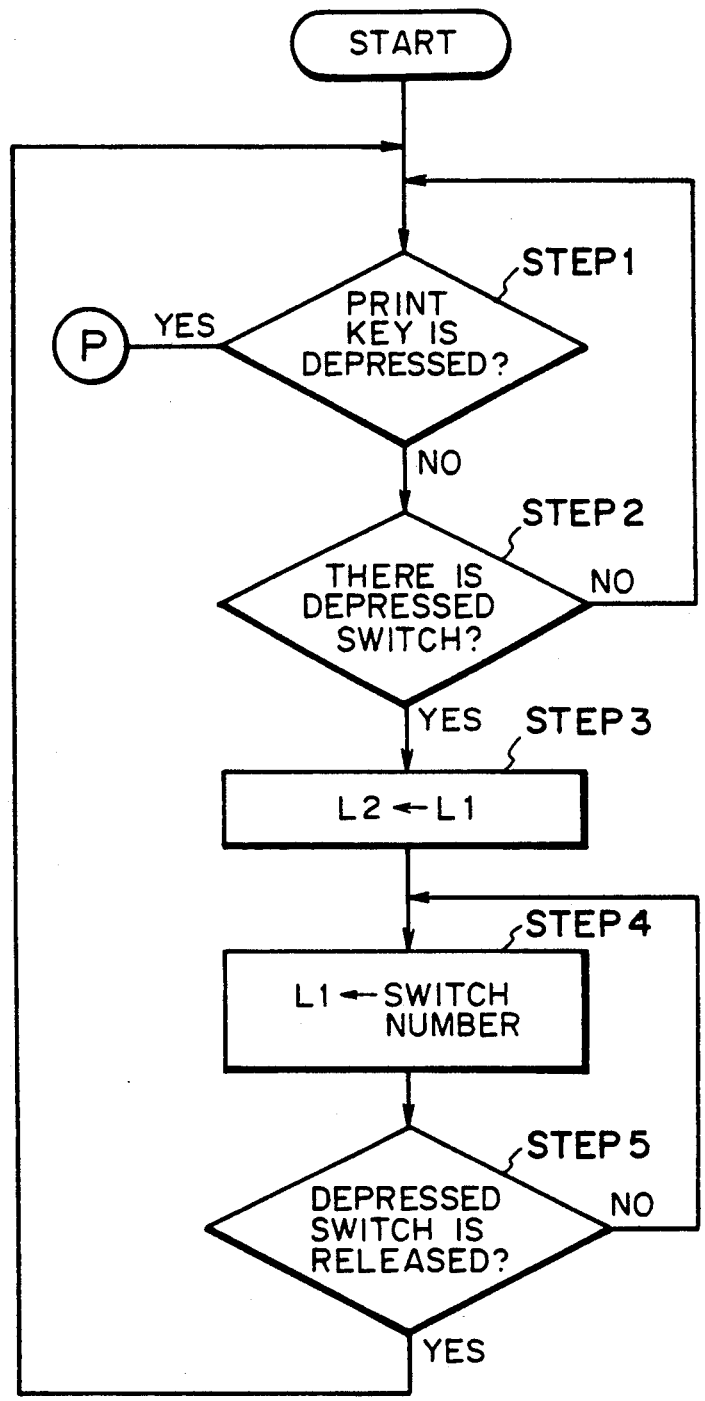

FIG. 11 is a flow chart of the program according to the fourth embodiment. FIG. 11 is a flow chart illustrating a method of designating a coordinate value in the horizontal direction or vertical direction. Displaying the designated coordinate point is carried out using the program of the first embodiment shown in FIGS. 14 and 15. Referring to FIG. 11, it is judged at step 1 if the print key has been depressed. If depressed, the above-described print process P is executed. If the print key has not been depressed, it is judged at step 2 if any one of the coordinate designating switches has been depressed. If not, the flow returns to step 1. If depressed, the switch number stored in L1 is stored in L2 at step 3, and the number of the presently depressed switch is stored in L1 at step 4. It is checked at step 5 if the presently depressed switch has been released or not. If not the flow returns to step 4 to update the switch number stored in L1. If the adjacent two switches are depressed, a mean voltage between two voltages obtained when two switches are depressed independently, is supplied to the microcomputer, as seen from FIG. 4. In such a case, it is considered that one of the switches SW 2 and SW 3 has been depressed. If it is judged at step 5 that the switch has been depressed, then the flow returns to step 1. In this manner, the coordinate point at the switch last released is recognized irrespective of the coordinate point at the switch first depressed, thereby realizing a natural switch handling operation.

Figure 19A:
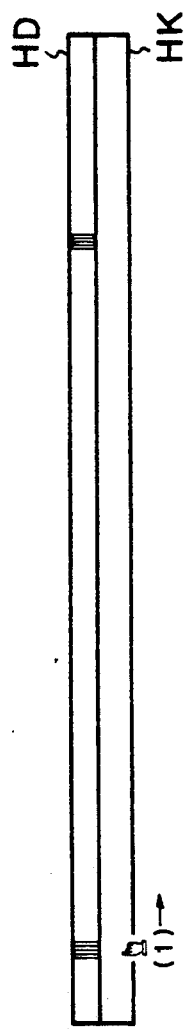
Figure 19B:
Figure 19C:
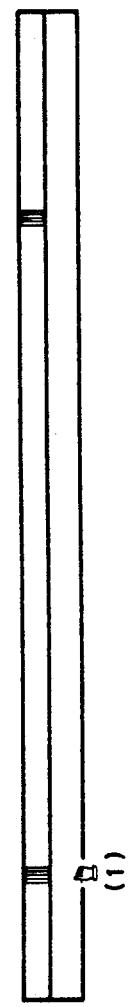

FIGS. 19A to 19C show examples of displayed coordinate designations. As shown in FIGS. 19A to 19C, if the finger is slid after depressing a switch at ①, then the display is sequentially shifted. Lastly, the coordinate point at the switch last depressed is displayed.

In the second embodiment, for example, if the right side is to be changed to the coordinate point positioned at a further right side and if the previous settings were carried out first for the left side and then for the right side, the previously set left side is canceled upon entering the coordinate point for the further right side. In such a case, if the coordinate point outside of the designated area is entered, e.g., if the coordinate point at a further right side is newly entered, then the right side coordinate point is arranged to be changed without changing the left side coordinate value. It is not necessary therefore to again enter the coordinate point at the left side.

Figure 12:
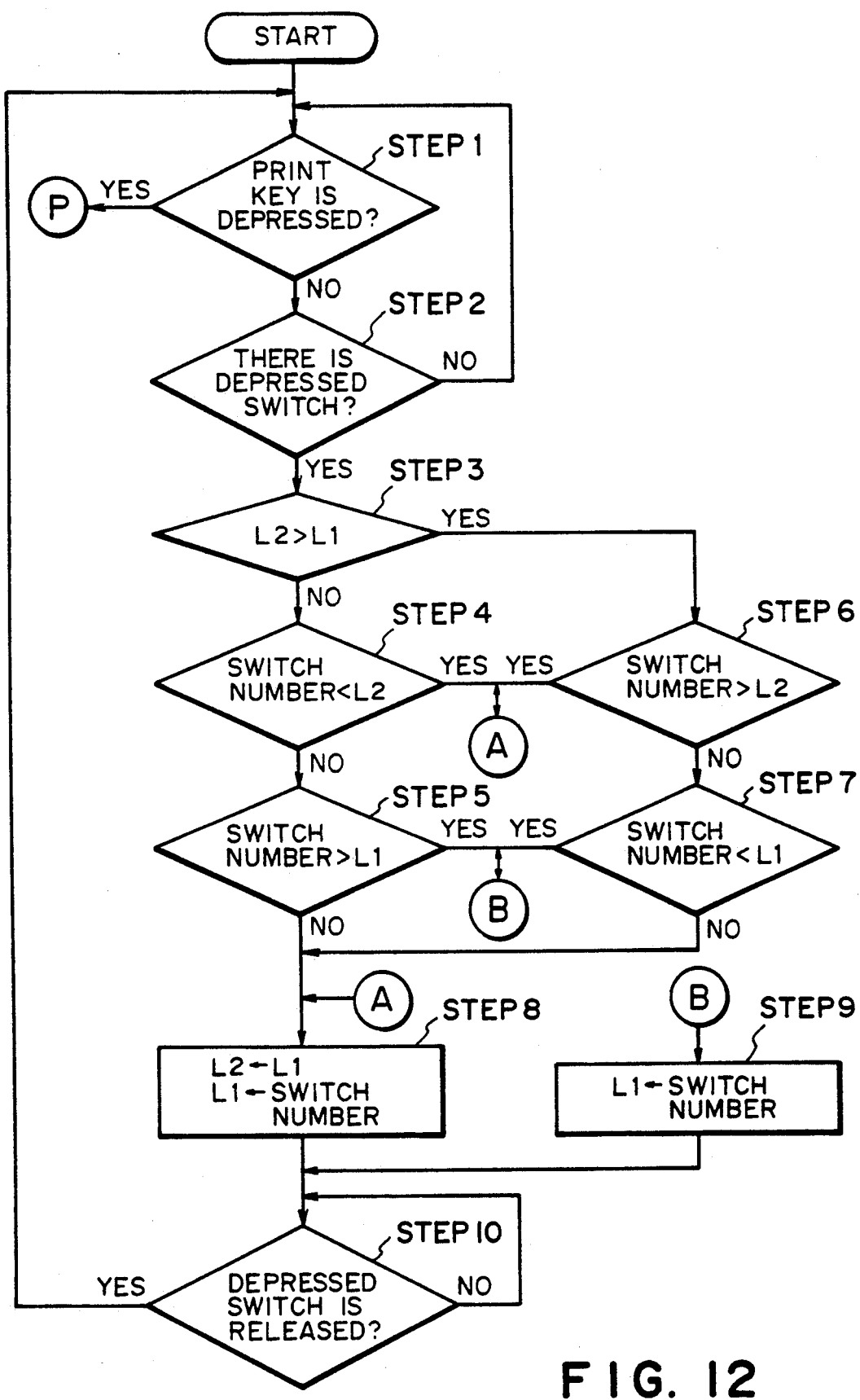

FIG. 12 is a flow chart of the program according to the fifth embodiment. FIG. 12 is a flow chart illustrating a method of designating a coordinate value in the horizontal direction or vertical direction. Displaying the designated coordinate point is carried out using the program of the first embodiment shown in FIGS. 14 and 15. Referring to FIG. 12, it is judged at step 1 if the print key has been depressed. If depressed, the above-described print process P is executed. If the print key has not been depressed, it is judged at step 2 if any one of the coordinate designating switches has been depressed. If not, the flow returns to step 1. If depressed, it is checked at step 3 which of the switch numbers stored in L1 and L2 are larger. If L2>L1, the flow advances to step 6 whereat it is judged if the depressed switch number is larger than L2. If larger, it is considered that the coordinate point near L2 and outside of the area defined by L1 and L2 has been entered. Thereafter the flow advances to step 8 to update the switch number in L2. If it is judged at step 6 that the depressed switch number is smaller than L2. Then, the flow advances to step 7 to compare the depressed switch number with that stored in L1. If smaller than L1, it is considered that the coordinate point near L1 outside of the area defined by L1 and L2 has been entered. Thereafter, the flow advances to step 9 to update the switch number in L1. If it is judged at step 7 that the depressed switch number is larger than L1, it is judged that the coordinate point within the area defined by L1 and L2 has been entered. Thereafter, the flow advances to step 8 to update the switch numbers stored in L1 and L2 in the order of depressing switches, like the second embodiment.

Similarly, if it is judged at step 3 as L2≦L1, then the flow advances to step 4 whereat the depressed switch number is compared with L2. If the depressed switch number is smaller than L2, it is considered that the coordinate point near L2 outside of the area defined by L1 and L2 has been entered. Then the flow advances to step 8 to update the switch number in L2. If it is judged at step 4 that the depressed switch number is larger than L2, the flow advances to step 5 to compare the depressed switch number with L1. If the depressed switch number is larger than L1, it is considered that the coordinate point near L1 outside of the area defined by L1 and L2 has been entered. Thereafter, the flow advances to step 9 to update the switch number in L1. If it is judged at step 5 that the depressed switch number is smaller than L1, it is considered that the coordinate point within the area defined by L1 and L2 has been entered. Thereafter, the flow advances to step 8 to update the switch numbers stored in L1 and L2 in the order of depressing switches, like the second embodiment.

Figure 20A:
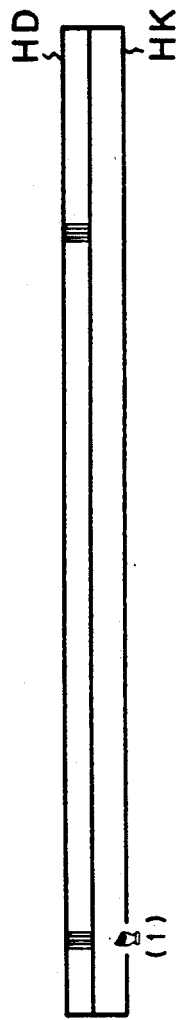
Figure 20B:
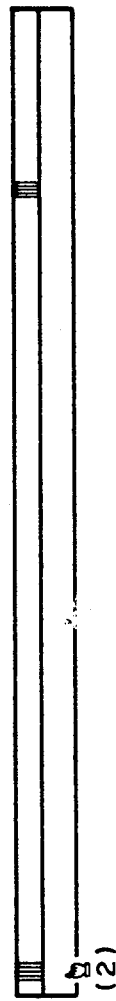
Figure 20C:
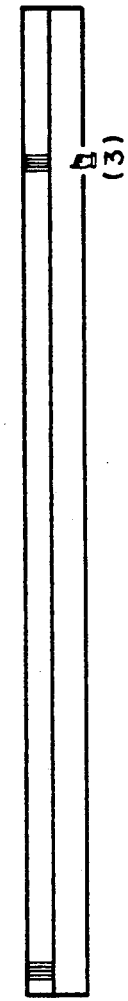
Figure 20D:
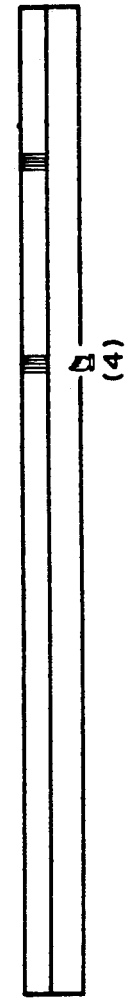

FIGS. 20A to 20D show examples of displayed coordinate designations. After depressing a switch at ① as shown in FIG. 20A, a switch at ② outside of the switch at ① is depressed. In this case, as shown in FIG. 20B, only the coordinate point at the left side is updated. If a switch at ③ is depressed as shown in FIG. 20C, only the coordinate point at the right side is updated. If a switch at ④ between ② and ③ is depressed as shown in FIG. 20D, the coordinate point at ② is canceled and the coordinate points at ③ and ④ are displayed.

Using the program described above, if a coordinate point outside of the already designated area is entered, e.g., if a coordinate point positioned at a further right side is entered, the coordinate point at the right side is changed without changing the coordinate point at the left side, irrespective of the order of depressing switches, thereby providing a more natural switch handling operation.

The program shown in the flow chart of FIG. 12 is made to run in parallel for both the horizontal and vertical directions by using a known multi-task processing or the like. In such a case, it is possible to shift a desired coordinate point to the outside of the area defined by the right, left, upper, and lower sides.

The above-described second to fifth embodiments may be realized independently or in combination thereof. In the second to fifth embodiments, a trimming function to print only the designated area has been described. However, the present invention is applicable to designate an area by using a masking function to print an area other than the designated area. In this case, the image data of an area other than the designated area is outputted to a printer. In other words, the present invention is applicable to all other cases where a rectangular area is designated.

In the above embodiments, as a means for identifying a designated coordinate point, a method of detecting a generated voltage as shown in FIG. 4 has been introduced. This method may be replaced by a known key matrix. Similarly, displaying an area may be realized by a known matrix method.

As described so far, according to the second to fifth embodiments, it is not necessary to use a clear key and depress coordinate switches in the predetermined order, but only the coordinate point to be changed is entered to change the area, thereby providing a more natural switch handling operation.

If a newly designated coordinate point is near the coordinate point already designated, then the newly designated coordinate point only is entered, thereby providing a more natural switch handling operation.

If another coordinate designating switch is depressed while depressing the previously depressed switch, the coordinate point is changed without changing the attributes (upper, lower, right, and left sides) of the previously depressed switch, thereby providing a more natural switch handling operation.

If a coordinate point positioned outside of the already designated area is designated, the coordinate point defining the area near at the designated coordinate point is changed, thereby providing a more natural switch handling operation.

The present invention is not limited to the above-described embodiments, but various changes and modifications are possible without departing from the scope of claims.

What is claimed is:

1. An area designating apparatus which determines the length of a desired area of an image in one of two directions by designating two points, comprising:
   designating means for designating a desired position;
   detecting means for detecting the position designated by said designating means; and
   controlling means for storing in a memory the last position detected by said detecting means and the position detected by said detecting means immediately before detecting the last detected position as coordinate values of the desired area in one of the two directions, wherein when one position is newly detected by said detecting means, said controlling means stores in said memory the last detected position and the newly detected position instead of the last detected position and the position detected immediately before the last detected position as the coordinate values of the desired area.

2. An area designating apparatus according to claim 1, further comprising second designating means for designating a desired position of the desired area in the direction perpendicular to one of the two directions.

3. An area designating apparatus according to claim 1, further comprising displaying means for displaying the position detected by said detecting means.

4. An area designating apparatus according to claim 1, wherein said designating means outputs a signal having a value corresponding to the designated position.

5. An area designating apparatus according to claim 1, wherein said memory ha a first storing area which stores the last detected position detected by said detecting means and a second storing area which stores the position detected by said detecting means immediately before detecting the last detected position, and when a position is newly detected by said detecting means, said controlling means stores the position stored in the first storing area un the second storing area nd stores the newly detected position in the first storing area.

6. An area designating apparatus according to claim 1, further comprising:
   reading means for reading an original image; and
   outputting means for outputting the original image read by said reading means,
   wherein said outputting means outputs an image of an area corresponding to the coordinate values of the desired area.

7. An area designating apparatus according to claim 6, wherein said reading means reads an image of a microfilm.

8. An area designating apparatus which determines the length f a desired area of an image in one of two directions by designating two points, comprising:
   designating means for designating a desired position;
   detecting means for detecting the position designated by said designating means;
   memory means for storing a first position and a second position detected by said detecting means; and
   controlling means for determining the first position and the second position stored in said memory means as coordinate values of the desired area, wherein when a third position newly detected by said detecting means is within a predetermined distance from the first position, said controlling means determines the second position and the third position instead of the first position and the second position as the coordinate values of the desired area, and when the third position is outside of the predetermined distance from the first position, said controlling means determines the first position and the third position instead of the first position and the second position as the coordinate values of the desired area.

9. An area designating apparatus according to claim 8, further comprising displaying means for displaying the position detected by said detecting means.

10. An area designating apparatus according to claim 8, wherein when the third position is within the predetermined distance from the first position, said controlling means stores in said memory means the third position instead of the first position, and when the third position is outside of the predetermined distance from the first position, said controlling means stores in said memory means the third position instead of the second position.

11. An area designating apparatus according to claim 8, wherein the first position is detected by said detecting means after the second position is detected.

12. An area designating apparatus according to claim 8, further comprising:
   reading means for reading an original image; and
   outputting means for outputting the original image read by said reading means,
   wherein said outputting means outputs an image of an area corresponding to the coordinate values of the desired area determined by said controlling means.

13. An area designating apparatus according to claim 12, wherein said reading means reads an image of a microfilm.

14. An area designating apparatus which determines the length of a desired area of an image in one of two directions by designating two points, comprising:

designating means for designating a desired position;

detecting means for detecting the position designated by said designating means;

memory means for storing a first position and a second position detected by said detecting means; and controlling means for determining the first position and the second position stored in said memory means as coordinate values of the desired area, wherein when a third position newly detected by said detecting means is outside of the desired area determined by the first position and the second position and the third position is on the side of the first position, said controlling means determines the second position and the third position instead of the first position and the second position as the coordinate values of the desired area, and when said third position is outside of the desired area determined by the first position and the second position and the third position is one the side of the second position, said controlling means determines the first position and the third position instead of the first position and the second position as the coordinate values of the desired area.

15. An area designating apparatus according to claim 14, wherein when a third position which is newly detected by said detecting means is outside of the desire area determined by the first position and the second position and the third position is on the side of the first position, said controlling means stores in said memory means the third position instead of the first position and when the third position is outside of the desired area determined by the first position and the second position and the third position is on the side of the second position, said controlling means determines the third position instead of the second position as the coordinate values of the desired area.

16. An area designating apparatus according to claim 14, further comprising display means for displaying the position detected by said detecting means.

17. An area designating apparatus according to claim 14, further comprising:

reading means for reading an original image; and outputting means for outputting the original image read by said reading means, wherein said outputting means outputs an image of an area corresponding to the coordinate values of the desired area determined by said controlling means.

18. An area designating apparatus according to claim 17, wherein said reading means reads an image of a microfilm.

19. An area designating apparatus according to claim 14, wherein when the third position is between the first position and the second position, said controlling means determines the third position and one which is detected after either of the first position or the second position is detected instead of the first position and the second position as the coordinate values of the desired area.

20. An area designating apparatus according to claim 19, wherein when the third position is between the first position and the second position, said controlling means store sin said memory means the third position instead of one which is detected before either of the first position or the second position is detected.

21. An area designating apparatus which determines the length of a desired area of an image in one of two directions by designating two points, comprising:

designating means for designating a desired position;

detecting means for detecting the position designated by said designating means;

memory means for storing a first position and a second position detected by said detecting means; and controlling means for determining the first position and the second position store din said memory means as coordinate values of the desire area, wherein when a third position which is newly detected by said detecting means is within a predetermined distance from the first position, said controlling means determines the second position and the third position instead of the first position and the second position as the coordinate values of the desired area, and when the third position is within said predetermined distance from the second position, said controlling means determines the first position and the third position instead of the first position and the second position as the coordinate values of said desired area.

22. An area designating apparatus according to claim 21, wherein when the third position is within the predetermined distance from the first position, said controlling means stores in said memory means the third position instead of the first position, and when the third position is within the predetermined distance from the second position, said controlling means stores in said memory means and the third position instead of the second position.

23. An area designating apparatus according to claim 21, further comprising:

reading means for reading an original image; and outputting means for outputting the original image read by said reading means, wherein said outputting means outputs an image of an area corresponding to the coordinate values of said desired area determined by said controlling means.

24. An area designating apparatus according to claim 23, wherein said reading means reads an image of a microfilm.

* * * * *

UNITED STATES PATENT AND TRADEMARK OFFICE
CERTIFICATE OF CORRECTION

PATENT NO. : 5,283,666
DATED : February 1, 1994
INVENTOR(S) : Otani

It is certified that error appears in the above-indentified patent and that said Letters Patent is hereby corrected as shown below:   On the title page: Item

[56] REFERENCES CITED:

U.S. PATENT DOCUMENTS, insert:
  4,700,237   10/1987   Yoshioka, et al. ............ 358/287
  4,965,678   10/1990   Yamada ..................... 358/452

COLUMN 5:

Line 54, "FIG." should read --FIG. 9--.

COLUMN 6:

Line 4, "at" should be deleted.
  Line 5, "point" should read --point at--.
  Line 39, "and" (first occurrence) should be deleted.
  Line 40, "switch 3 at" should read --at switch 3--.

COLUMN 10:

Line 2, "ha" should read --has--.
  Line 9, "an" should read --in-- and "nd" should read --and--.
  Line 23, "f" should read --of--.

COLUMN 11:

Line 25, "one" should read --on--.
  Line 32, "desire" should read --desired--.
  Line 36, "position and" should read --position, and--.

UNITED STATES PATENT AND TRADEMARK OFFICE
CERTIFICATE OF CORRECTION

PATENT NO. : 5,283,666
DATED : February 1, 1994
INVENTOR(S) : Otani

It is certified that error appears in the above-indentified patent and that said Letters Patent is hereby corrected as shown below:

<u>COLUMN 12</u>:

Line 11, "store sin" should read --stores in--.
Line 23, "store din" should read --stored in--.
Line 24, "desire" should read --desired--.
Line 44, "and" should be deleted.

Signed and Sealed this

Eighth Day of November, 1994

BRUCE LEHMAN

Attest:

Attesting Officer

Commissioner of Patents and Trademarks